(12) United States Patent
Tailliet

(10) Patent No.: US 11,892,958 B2
(45) Date of Patent: Feb. 6, 2024

(54) COMMUNICATION ON AN I2C BUS

(71) Applicant: STMicroelectronics (Rousset) SAS, Rousset (FR)

(72) Inventor: François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/667,515

(22) Filed: Feb. 8, 2022

(65) Prior Publication Data
US 2022/0276972 A1 Sep. 1, 2022

(30) Foreign Application Priority Data
Feb. 26, 2021 (FR) ...................... 2101921

(51) Int. Cl.
*G06F 13/16* (2006.01)
*G06F 12/02* (2006.01)

(52) U.S. Cl.
CPC ...... *G06F 13/1668* (2013.01); *G06F 12/0246* (2013.01); *G06F 2212/2022* (2013.01); *G06F 2213/0016* (2013.01)

(58) Field of Classification Search
CPC ............ G06F 12/0246; G06F 13/1668; G06F 2212/2022; G06F 2213/0016
See application file for complete search history.

(56) References Cited

U.S. PATENT DOCUMENTS

| | | | |
|---|---|---|---|
| 5,631,850 A | 5/1997 | Tanaka et al. | |
| 10,102,177 B2 | 10/2018 | Yoshida | |
| 2012/0243559 A1* | 9/2012 | Pan | H04J 3/1605 370/503 |
| 2015/0256384 A1* | 9/2015 | Van Den Hurk | H04L 61/5038 709/220 |
| 2015/0381565 A1* | 12/2015 | Thaler | H04L 61/5046 370/389 |
| 2016/0224490 A1* | 8/2016 | Danis | G06F 13/32 |
| 2016/0275027 A1* | 9/2016 | Venkatasubba | G06F 13/362 |
| 2016/0371210 A1* | 12/2016 | Van Der Zande | H04L 61/5038 |
| 2019/0129875 A1* | 5/2019 | Chard | G06F 1/3225 |
| 2021/0216490 A1* | 7/2021 | Kumar | G06F 13/4282 |
| 2021/0402783 A1* | 12/2021 | Studer | B41J 2/17556 |

* cited by examiner

*Primary Examiner* — Eric T Oberly
(74) *Attorney, Agent, or Firm* — Slater Matsil, LLP

(57) ABSTRACT

The present description concerns attribution, on a communication over an I2C bus, of a first address to a first device by a second device, wherein the second device sends the first address over the I2C bus and, if the second device receives no acknowledgment data, then the first device records the first address.

31 Claims, 5 Drawing Sheets

COMMUNICATION ON AN I2C BUS

CROSS-REFERENCE TO RELATED APPLICATIONS

This application claims the benefit of French Patent Application No. 2101921, filed on Feb. 26, 2021, which application is hereby incorporated herein by reference.

TECHNICAL FIELD

The present disclosure generally relates to electronic devices, systems and methods. More particularly, the present disclosure concerns devices and methods for communication over an I2C bus.

BACKGROUND

A computer bus is a device of data transmission between a plurality of electronic devices, for example, between a plurality of components of a same electronic system. A bus generally comprises one or a plurality of lines adapted to transmitting different types of signals, for example, address signals, data signals, clock signals, etc. Each data bus is implemented by a communication protocol which defines the way in which the logic data are exchanged between the devices.

Among the different existing buses and communication protocols, the I2C (Inter-Integrated Circuit) technology is a communication technology very widely used today in the industry for the communication between different devices. A bus adapted to the I2C technology is a bidirectional serial bus using two transmission lines, more precisely, a data transmission line, and a clock signal transmission line.

It would be desirable to be able to improve, at least partly, known communication techniques using a bus adapted to the I2C communication.

SUMMARY

There is a need for more reliable communication techniques.

There is a need for more reliable communication techniques using a bus adapted to the I2C communication.

There is a need for I2C bus communication techniques enabling a master device to easily assign an address to a slave device.

An embodiment overcomes all or part of the disadvantages of known communication techniques using a bus adapted to the I2C communication.

An embodiment provides a method of attribution, on a communication over an I2C bus, of a first address to a first device by a second device, wherein the second device sends the first address over the I2C bus and, if the second device receives no acknowledgement data, then the first device records the first address.

According to an embodiment, if the second device receives acknowledgement data, then the first device does not record the first address.

According to an embodiment, the first device records the first address in non-volatile registers.

According to an embodiment, the first address is assigned to no device with which the second device may be communicating.

According to an embodiment, the first device is in an attribution mode where it expects to be assigned an address, and leaves this attribution mode when it records the first address.

According to an embodiment, the first device comprises a first state variable indicating whether it is in the attribution mode or not.

According to an embodiment, the first device comprises a second state variable indicating whether it has recorded or not an address.

According to an embodiment, the first address comprises a device type identifier and a device number.

According to an embodiment, the first device is a slave device of the communication over an I2C bus.

According to an embodiment, the first device is a memory.

According to an embodiment, the first device is a non-volatile memory of EEPROM type.

According to an embodiment, the second device is a master device of the I2C bus communication.

According to an embodiment, the second device is a processor.

An embodiment provides a method of configuring a third device comprising the described attribution method.

An embodiment provides a device adapted to implementing the described attribution method.

There is a need for more reliable communication techniques.

There is a need for more reliable communication techniques using a bus adapted to the I2C communication.

There is a need for I2C bus communication techniques enabling a master device to easily assign an address to a slave device.

An embodiment overcomes all or part of the disadvantages of known communication techniques using a bus adapted to the I2C communication.

An embodiment provides a method of attribution, on a communication over an I2C bus, of a first address to a first device by a second device, wherein the second device sends the first address over the I2C bus and, if the second device receives no acknowledgement data, then the first device records the first address.

According to an embodiment, if the second device receives acknowledgement data, then the first device does not record the first address.

According to an embodiment, the first device records the first address in non-volatile registers.

According to an embodiment, the first address is assigned to no device with which the second device may be communicating.

According to an embodiment, the first device is in an attribution mode where it expects to be assigned an address, and leaves this attribution mode when it records the first address.

According to an embodiment, the first device comprises a first state variable indicating whether it is in the attribution mode or not.

According to an embodiment, the first device comprises a second state variable indicating whether it has recorded or not an address.

According to an embodiment, the first address comprises a device type identifier and a device number.

According to an embodiment, the first device is a slave device of the communication over an I2C bus.

According to an embodiment, the first device is a memory.

According to an embodiment, the first device is a non-volatile memory of EEPROM type.

According to an embodiment, the second device is a master device of the I2C bus communication.

According to an embodiment, the second device is a processor.

An embodiment provides a method of configuring a third device comprising the described attribution method.

An embodiment provides a device adapted to implementing the described attribution method.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, all the different control signals capable of being sent by a master device to a slave device are not exhaustively detailed.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The signals mentioned in the disclosure are analog signals comprising a high state and a low state respectively corresponding to logic data "1" (one) and "0" (zero). The high state represents, unless mentioned otherwise, a high voltage level, for example, equal to a power supply voltage. The low state represents, unless mentioned otherwise, a low voltage level, for example, equal to a reference voltage, for example, the ground.

Figure 1:
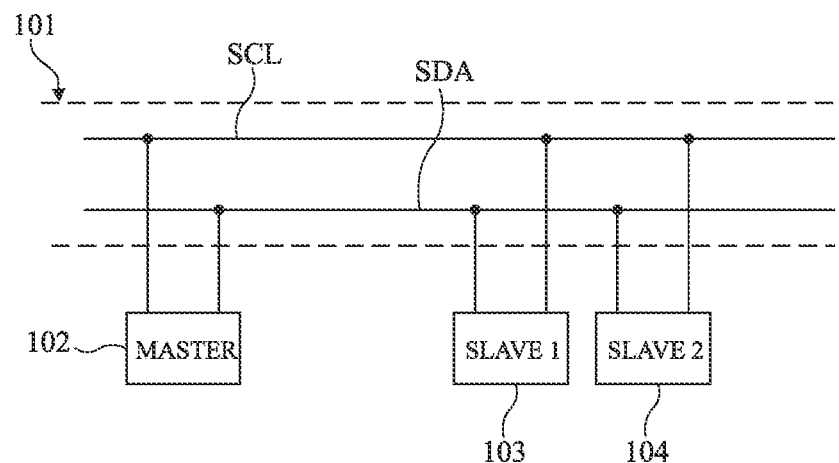
FIG. 1 schematically shows in the form of blocks a communication over an I2C bus.

FIG. 1 schematically shows in the form of blocks a communication over an I2C (Inter-Integrated Circuit) bus.

FIG. 1 shows an I2C bus 101 formed of two transmission lines SCL and SDA. Transmission line SCL is adapted to transmitting a clock signal enabling to rate the data transmission of the bus. A clock signal is an analog signal periodically varying between a high level and a low level. Transmission line SDA is adapted to transmitting an analog signal varying between a high level and a low level representing data and control signals.

Transmission lines SCL and SDA are, in practice, conductors having a voltage level controlled by the electronic devices using bus 101. In the idle state, that is, when lines SCL and SDA do not transmit signals, lines SCL and SDA are maintained at a high voltage level, for example, by pull up resistors, not shown in FIG. 1.

FIG. 1 further shows electronic devices using bus 101 to communicate together. FIG. 1 more precisely shows a master electronic device 102 (MASTER) of the I2C bus communication, or master device 102, and two slave electronic devices 103 (SLAVE 1) and 104 (SLAVE 2) of the I2C bus communication, or slave devices 103 and 104.

Figure 4:
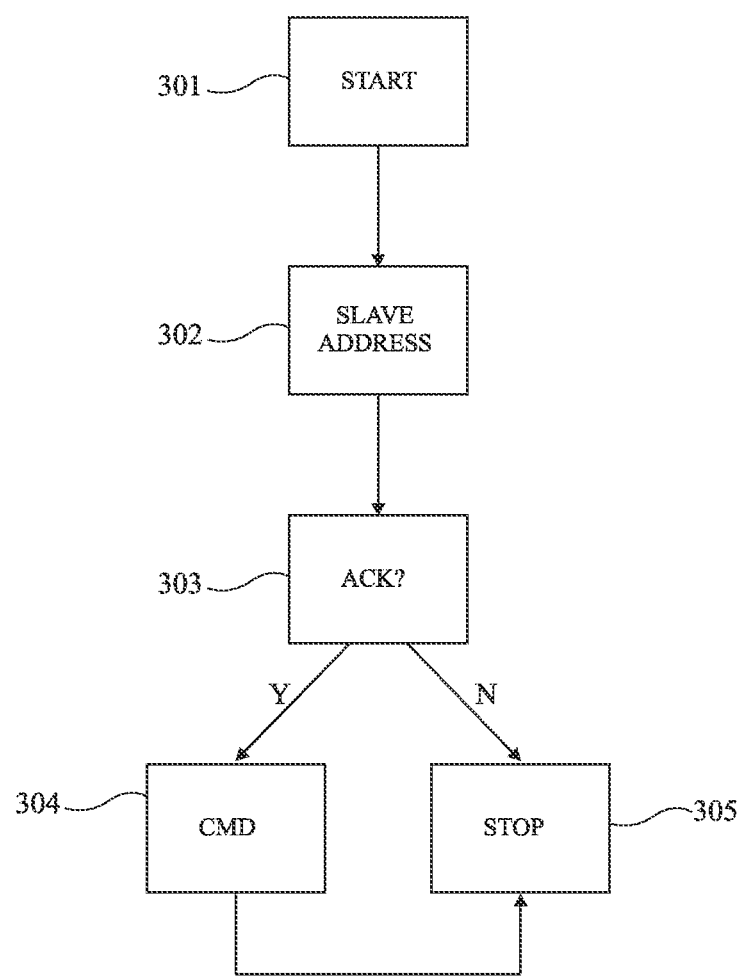
FIG. 4 schematically shows in the form of blocks the implementation of a communication over an I2C bus.

In a communication over an I2C bus, a master device, such as master device 102, is the device having initiated the I2C bus communication, which gives it tasks specific to its master device status. Among these different tasks, the master device is particularly adapted to:

imposing the clock frequency of the clock signal transmitted by line SCL of the I2C bus;
  starting and stopping the I2C bus communication by imposing a start condition and a stop condition described in relation with FIG. 4; and
  transmitting and/or receiving control signals and/or data by using the SDA line.

Slave devices 103 and 104 are electronic devices which have not initiated the I2C bus communication. Slave devices 103 and 104 are adapted to transmitting and/or receiving the control signals and/or the data by using the SDA line to communicate with master device 102. Each slave device 103, 104 responds to an address, which is described in relation with FIG. 2.

According to an example, master device 102 may be a processor, or a microprocessor of an electronic system, and slave devices 103 and 104 may be other components of this electronic system such as memories, data acquisition devices, communication devices, etc. Examples of slave devices are described in relation with FIG. 3.

FIG. 1 shows an I2C bus communication comprising a master device 102 and a plurality of, here, two, slave devices 103 and 104. Obviously, the I2C communication may be adapted to the communication of a master device with a single slave device, or more than two slave devices, or further be adapted to the communication of a plurality of master devices with one another or with one or a plurality of slave devices. The embodiments described hereafter apply to the I2C bus communication between a master device and one or a plurality of slave devices.

Figure 2:
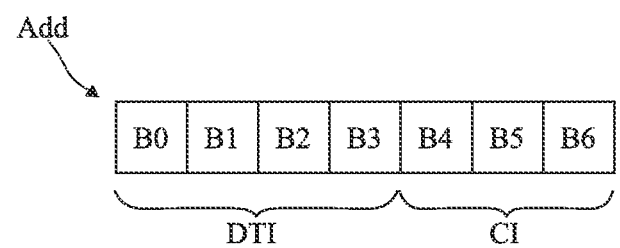
FIG. 2 schematically shows in the form of blocks an address of an electronic device.

FIG. 2 schematically shows in the form of blocks an address of a slave device of the type of the slave devices 103 and 104 described in relation with FIG. 1.

To initiate an I2C bus communication with a slave device, a master device sends, over the data transmission line of the I2C bus, the address of the slave device with which it desires to initiate the communication. There exists a plurality of slave device address formats. An address format capable of being used is the following.

An address Add of a slave device is formed of seven bits B0 to B6. The address is divided into two portions, each representing specific information.

The four most significant bits B0 to B3 represent the device type identifier DTI enabling to identify the nature of the slave device. Indeed, each type of electronic device likely to use an I2C bus communication is symbolized by an identifier coded over four bits. According to an example, an EEPROM-type (Electrically Erasable Programmable Read Only Memory) non-volatile memory is symbolized by identifier "1010".

The three least significant bits B4 to B6 represent the number CI of the device (CI, Chip Identifier). Number CI enables to differentiate a plurality of electronic devices of same nature used in a same electronic system. According to an example, if the slave device is the only one of its type, then its number CI is "000".

According to an example, if an electronic system comprises two EEPROM-type non-volatile memories, the addresses of the two memories may be: "1010000", and "1010001".

Further, a slave device may use a plurality of addresses to implement an I2C bus communication. According to an example, a first address, or main address, may be used to send a first type of control signal, and a second address, or secondary address, may be used for a second control signal type. The main address may for example respect the rules of forming of address Add described in relation with FIG. 2, and the secondary address may also respect these rules, or may respect other forming rules. According to a more precise example, if the device is a memory, a main address may enable to receive read and write control signals, while a secondary address may enable to receive memory configuration control signals.

Figure 3:
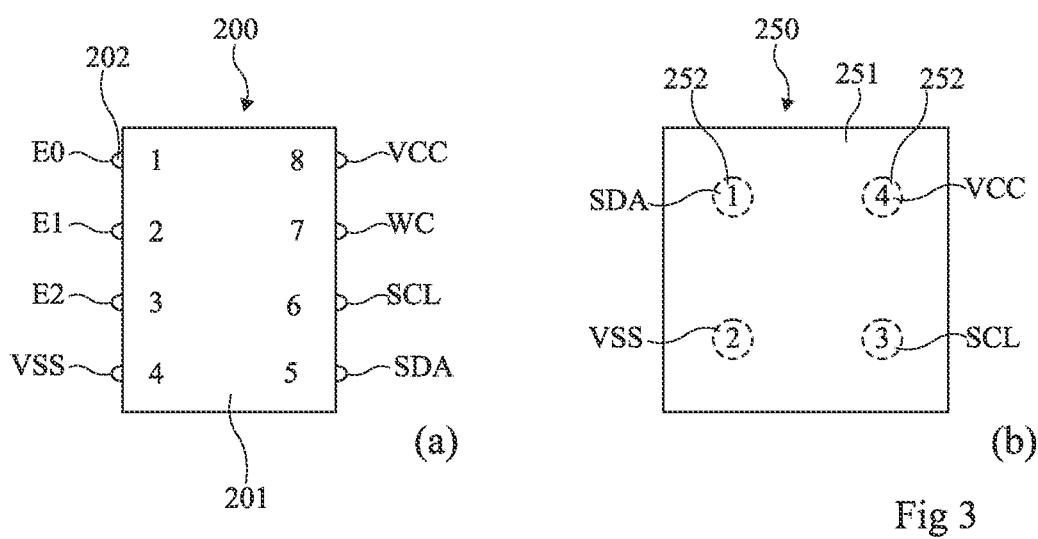
FIG. 3 schematically shows two views (a) and (b) illustrating variants of an electronic device.

FIG. 3 comprises two views (a) and (b) schematically showing electronic devices capable of being slave devices in an I2C bus communication.

View (a) is a simplified top view of an EEPROM-type non-volatile memory 200. Memory 200 is protected by a rectangular package 201, in top view, having eight connection terminals 202 bearing references 1 to 8 in view (a) protruding therefrom. Connection terminals 202 are arranged in groups of four on parallel sides of package 201.

Non-volatile memory 200 is adapted for an I2C bus communication, and this is an example of use of the eight connection terminals 202. Reference connection terminal 4 receives a low-level reference signal VSS, for example, the ground. Reference connection terminal 8 receives a high-level reference signal VCC, for example, a power supply voltage. Terminals 1 to 3 deliver the three bits of number CI of memory 200. For this purpose, each terminal 1 to 3 is coupled either to terminal 4 (VSS), if the terminal indicates a "0" (zero), or to terminal 8 (VCC), if the terminal indicates a "1" (one). Terminal 5 is coupled, preferably connected, to the transmission line SDA of an I2C bus. Terminal 6 is coupled, preferably connected, to the transmission line SCL of the I2C bus. Terminal 7 may for example receive a signal WC— (Write Control) enabling to configure the protection, or not, of data stored in memory 200.

View (b) is a simplified top view of another EEPROM-type non-volatile memory 250. Memory 250 is protected by a package 251, which is rectangular, or even square, in top view, having four connection terminals 252 bearing reference numerals 1 to 4 in view (b) protruding therefrom. The connection terminals are arranged at the four corners of package 251.

Non-volatile memory 250 is adapted to the I2C bus communication, and this is an example of use of the four connection terminals 252. Terminal 1 is coupled, preferably connected, to the transmission line SDA of an I2C bus. Reference connection terminal 2 receives a low-level reference signal VSS, for example, the ground. Terminal 3 is coupled, preferably connected, to the transmission line SCL of the I2C bus. Reference connection terminal 4 receives a high-level reference signal VCC, for example, a power supply voltage.

In the case of memory 200, a portion of the address of the memory usable for an I2C bus communication is directly accessible on the connection terminals 202 of the package of memory 200, the other portion being stored in specific registers of memory 200. More particularly, the bits B4, B5, B6 of the address of the circuit described in FIG. 2 are defined by the voltage level of terminals E2, E1, E0. Whereas, in the case of memory 250, the memory address is stored in specific registers of memory 250.

FIG. 4 is a block diagram illustrating a conventional example of an I2C bus communication between a master device M of the type of the device 102 described in relation with FIG. 1, and a slave device S, of the type of the devices 103 and 104 described in relation with FIG. 1. Devices M and S are coupled by an I2C bus of the type of the bus 101 described in relation with FIG. 1, comprising data transmission line SDA, and clock signal transmission line SCL.

Before the I2C communication between devices M and S starts, the signals transmitted by lines SCL and SDA are not used and are kept at a high level.

According to an example, the I2C communication described in relation with FIG. 4 is a communication based on control signals comprising eight data bits. Further, the address format used by slave device S is that described in relation with FIG. 2.

At an initial step 301 (START), the I2C communication between devices M and S starts. For this purpose, master device M transmits a start condition. An I2C communication start condition is for example defined by a falling edge of the signal transmitted by line SDA while the signal on line SCL is at a high level.

The start condition imposed by master device M has the function of informing slave device S of the starting of an I2C communication. Such an interruption results in informing slave device S that an I2C bus communication starts. In other words, the interruption results in "waking up" or in "alerting" slave device S.

Once the start condition has passed, master device M transmits a clock signal via line SCL. Thus, the signal on line SCL has, after the start condition, a first falling edge and switches to a low level.

At a step 302 (SLAVE ADDRESS), master device M sends a first control signal. This first control signal comprises the address of the slave device with which it desires to communicate, in the case in point, here, the address of slave device S. To read this control signal, slave device S reads data of signal SDA at each rising edge of signal SCL.

As an example, this first control signal comprises the seven bits of the address of slave device S and a bit indicating the nature of the next control signal. This last bit may for example indicate the communication direction of the next control signal or response. According to an example, if the last bit represents a "0" (zero), then the communication occurs in the direction from the master device to the slave device, while if the last bit represents a "1" (one), the communication occurs in the direction from the slave device to the master device. In other words, if the last bit represents a "0", then the master device is in transmit position and the slave device in receive position, while if the last bit represents a "1" (one), the master device is in receive position and the slave device in transmit position.

At a step 303 (ACK?), if the address sent by master device M at step 302 corresponds to the address, or to one of the addresses, of slave device S, then device S sends acknowledgement data to master device M (output Y). The next step is a step 304 (CMD). If master device M receives no acknowledgement data (output N), then the communication stops, the next step is a step 305 (STOP). Master device M may receive acknowledgement data from another slave device (case not shown in FIG. 4), in this case the communication starts with this other slave device, and slave device S does not follow the communication. Acknowledgement data sent by device S are, for example, a setting to the low state of signal SDA.

At step 304, devices M and S are ready to communicate. Master and slave devices M and S exchange control signals and/or data. Once the control signal and/or data exchange is over, the next step is step 305. It should be noted that, on an I2C bus communication based on eight-bit control signals, the device having the receive position sends acknowledgement data to the device having the transmit position after the reception of each group of eight data bits. If the device having the receive position sends no acknowledgement data at the desired time, the device having the transmit position considers that the device having the receive position is no longer alert to communicate therewith. Master device M stops the communication in the way described in relation with step 305.

At step 305, master device M having received no acknowledgement data, it transmits a stop condition enabling to stop the communication. An I2C communication stop condition is defined, for example, by a rising edge of the SDA signal while the SCL signal is at a high level. The I2C communication between devices M and S is then over.

Figure 5:
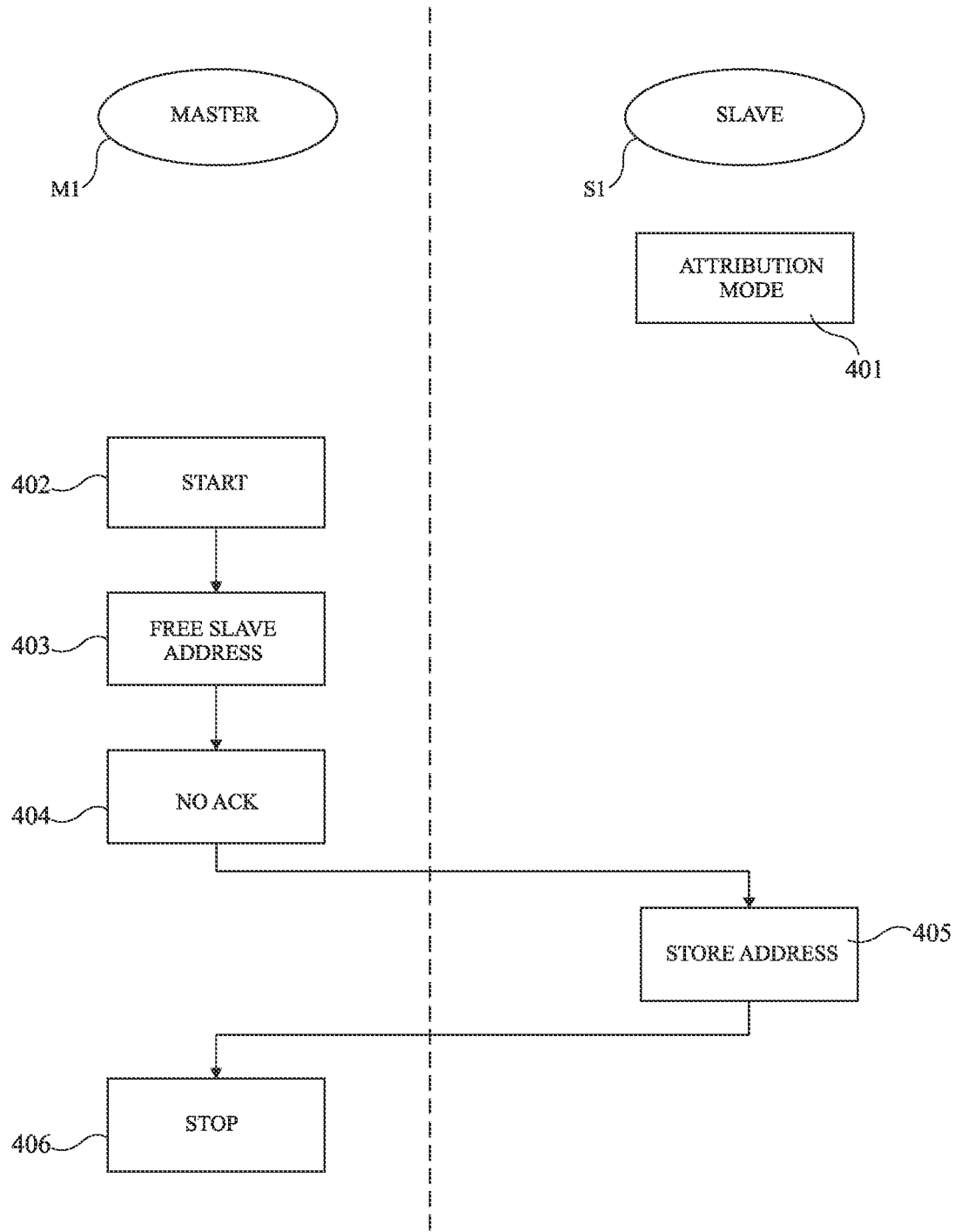
FIG. 5 schematically shows in the form of blocks an implementation mode of a method of assigning an address to a device by I2C bus communication.

FIG. 5 schematically illustrates, in the form of blocks, an implementation mode of a method of attribution of an address Add1 to a slave device S1 (SLAVE) implemented by a master device M1 (MASTER) on an I2C bus communication.

Master device M1 and slave device S1 are coupled by an I2C bus (not shown in FIG. 5) of the type of the I2C bus 101 described in relation with FIG. 1, comprising a data line, of the type of the transmission line SDA described in relation with FIG. 1, and a clock line, of the type of the transmission line SCL described in relation with FIG. 1. Master device M1 may be coupled, by the I2C bus, to other slave devices, not shown in FIG. 5.

Address Add1 is a free address which is used by no slave device with which master device M1 is likely to carry out an I2C bus communication. Address Add1 is intended to be assigned to slave device S1. According to an example, address Add1 is a seven-bit binary word.

At a step 401 (ATTRIBUTION MODE), slave device S1 has entered an operating mode where it expects to be assigned an address, called attribution mode. According to an example, slave device S1 may comprise a data bit, for example, a state variable, indicating that it is in the attribution mode.

According to an example, slave device S1 may be directly in this mode at the end of its manufacturing. According to another example, master device M1 may have previously sent a control signal to the slave device S1 asking it to enter this attribution mode.

At a step 402 (START), similar to the step 301 described in relation with FIG. 4, master device M1 transmits a start condition, to start the I2C bus communication.

At a step 403 (FREE SLAVE ADDRESS), directly following step 402, master device M1 sends a first control signal over the data line of bus I2C. This first control signal comprises addresses Add1, which is assigned to no slave device with which master device M1 is likely to communicate via the I2C. According to an example, if the first control signal is an eight-bit binary word, and address Add1 a seven-bit binary word, the last bit of the control signal indicates the nature of the next control signal. According to an embodiment, the last bit represents a default value, for example, a "0" (zero).

At a step 404 (NO ACK) directly following step 403, master device M1 receives no acknowledgment data. Since, at that time, address Add1 is assigned to no device likely to communicate with master device M1, it is normal that master device M1 receives no acknowledgement data.

At a step 405 (STORE ADDRESS), the slave device S1 having followed the exchange of control signals having occurred over the data line of the I2C bus, slave device S1 understands that the address Add1 sent by master device M1 is a free address. Indeed, if address Add1 had not been free, the slave device responding to address Add1 would have sent acknowledgment data at step 404. Slave device S1 then stores address Add1, for example, in a volatile register. Slave device S1 may consider address Add1 as one of its addresses, for example, as being a secondary address, and respond to master device M1 when the latter will start a future communication by asking for the device associated with address Add1. An example of steps implemented by slave device S1 to record address Add1 is described in relation with FIGS. 6 and 7.

Slave device S1 may use address Add1 in different ways. According to an embodiment, slave device S1 may modify its main address into address Add1. According to another example of embodiment, slave device S1 may record address Add1 as a secondary address or use address Add1 to modify one of its secondary addresses. According to another example of embodiment, slave device S1 may use address Add1 as a temporary secondary address, that is, use address Add1 as a secondary address but for a limited number of I2C bus communications. By using address Add1 as a temporary secondary address, or dynamic secondary address, slave device S1 may for example modify one of its secondary addresses into another address than address Add1. It will be within the abilities of those skilled in the art to find other uses for address Add1.

At a step 406 (STOP), master device M1, having received no acknowledgment data, ends the communication by sending a stop condition over data line SDA. This step is similar to the step 305 described in relation with FIG. 4.

Figure 6:
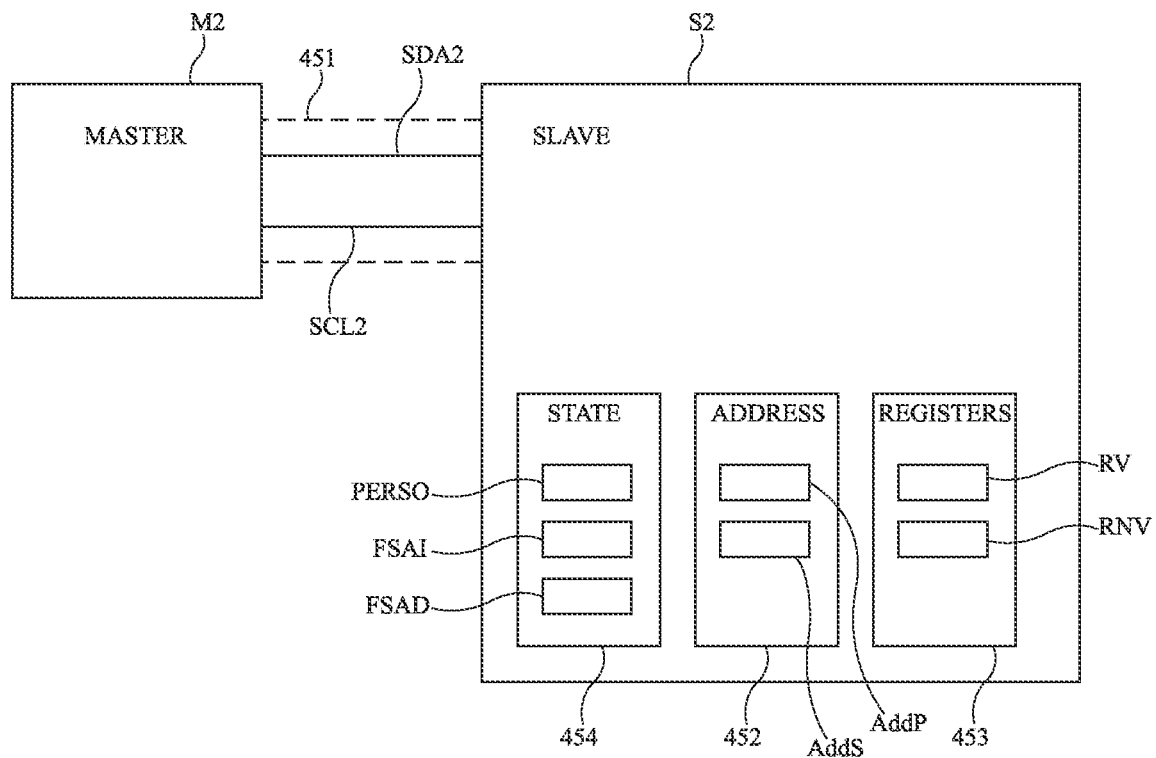
FIG. 6 schematically shows in the form of blocks another I2C bus communication.
Figure 7:
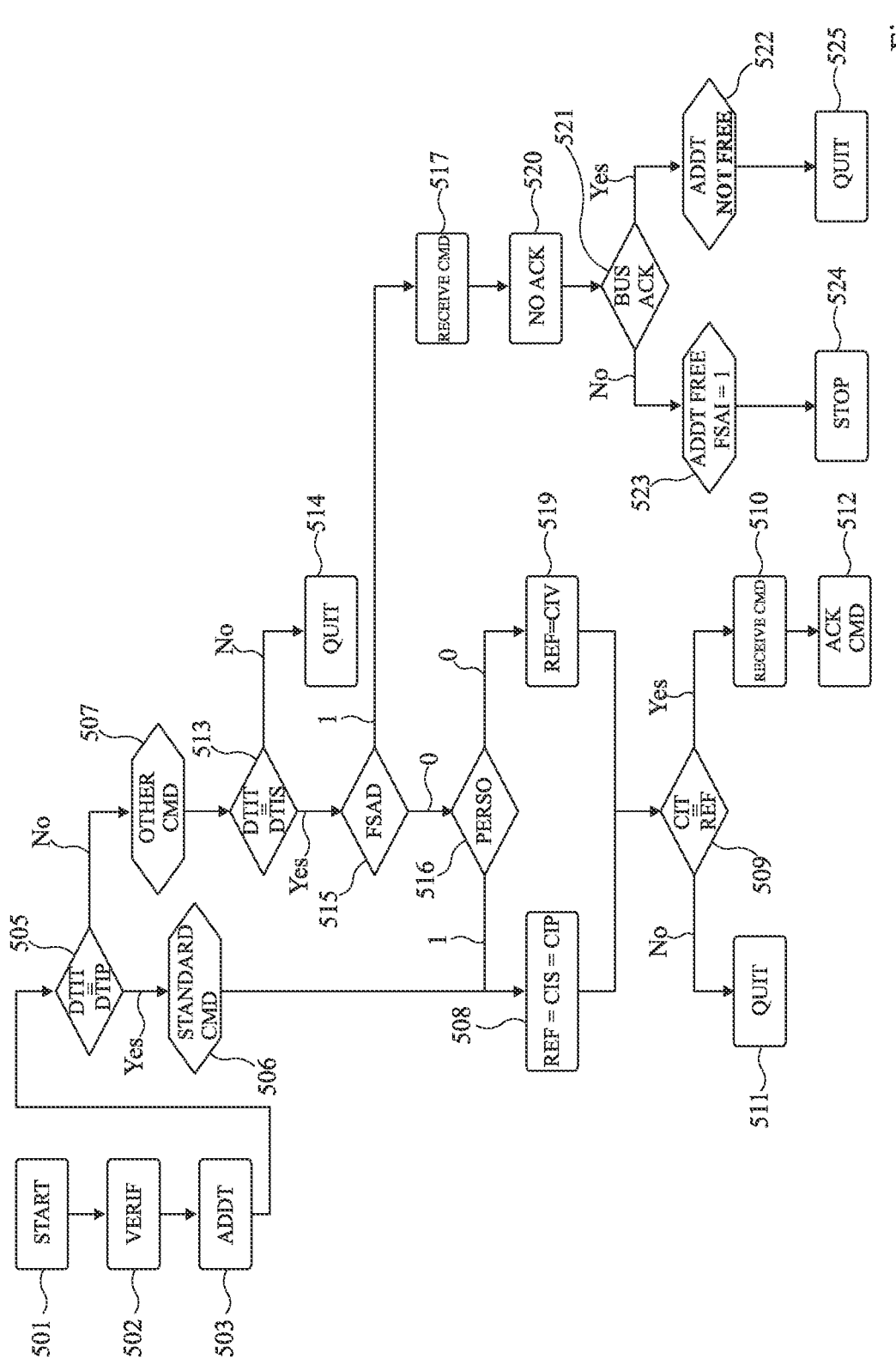
FIG. 7 schematically shows, in the form of blocks, an implementation mode of a method of configuring a device.

FIGS. 6 and 7 illustrate a practical example of steps implemented by a slave device on implementation of the attribution method described in relation with FIG. 5. More particularly, FIG. 6 schematically illustrates in the form of blocks an I2C bus communication between a master device M2 (MASTER) and a slave device S2 (SLAVE). FIG. 7 is a block diagram more particularly illustrating the steps implemented by slave device S2.

In FIG. 6, master device M2 and slave device S2 are coupled by an I2C bus 451, of the type of the I2C bus 101 described in relation with FIG. 1, comprising a data line SDA2, of the type of the transmission line SDA described in relation with FIG. 1, and a clock line SCL2, of the type of the transmission line SCL described in relation with FIG. 1.

Master device M2 is an electronic device of the type of the device M1 described in relation with FIG. 5. According to an example, master device M2 is a processor, or a microprocessor, of an electronic system. Master device M2 is adapted to implementing the address attribution method described in relation with FIG. 5.

Slave device S2 is an electronic device of the type of the device S1 described in relation with FIG. 5. According to an example, slave device S2 is a memory, for example, a volatile memory or a non-volatile memory, of an electronic system. Slave device S2 is adapted to implementing the address attribution method described in relation with FIG. 5.

Further, slave device S2 responds to a plurality of addresses 452 (ADDRESS). According to an example, slave device S2 responds to a main address AddP and, further, to a secondary address AddS. Main address AddP is used by master device M2 to send conventional control signals to slave device S2. According to an example, if slave device S2 is a memory, master device M2 uses main address AddP to send read and write control signals to slave device S2. Secondary address AddS is used by master device M2 to send more specific control signals to slave device S2, for example, configuration control signals. According to an embodiment, addresses AddS and AddP are stored in non-volatile registers of slave device S2.

According to an embodiment, slave device S2 is a device having one or a plurality of configurable addresses. As an example, the secondary address AddS of slave device S2 is configurable at the end of the manufacturing of device S2. Address AddS is for example set to a default value at the end of the manufacturing of slave device S2. A configuration step is necessary at the beginning of the use of slave device S2 to define its secondary address AddS. This configuration step is all the more important as secondary address AddS may be used to send configuration control signals to slave device S2. Indeed, if secondary address AddS is defined on manufacturing by a default value, nothing guarantees that this address is not already used by another slave device with which master device M2 can initiate an I2C bus communication. This configuration step may be implemented, by master device M2, by using the address attribution method described in relation with FIG. 5.

According to an embodiment, addresses AddP and AddS are of the type of the address Add described in relation with FIG. 2. Thus, address AddP, respectively AddS, is formed of an identifier DTIP, respectively DTIS, of the device type and of a device number CIP, respectively CIS. According to an example, addresses AddP and AddS are seven-bit binary words, identifiers DTIP and DTIS are four-bit binary words, and numbers CIP and CIS are$_3$-bit binary words.

For the practical example described herein, it is considered that the slave device differentiates its main address from its secondary address(es) in that they have different identifiers, but identical numbers. In other words, according to an embodiment, addresses AddP and AddS have different DTIP and DTIS identifiers, and identical numbers CIP and CIS. It will be within the abilities of those skilled in the art to design a set of steps implemented by slave device S2 where slave device S2 differentiates its main address from its secondary address(es) in that they have different numbers. It will further be within the abilities of those skilled in the art to design a set of steps implemented by slave device S2 where the slave device does not consider the composition of its main and secondary addresses to differentiate them.

Slave device S2 further comprises registers 453 (REGISTERS) that may be adapted to storing data during the implementation of an I2C bus communication. More particularly, slave device S2 comprises volatile storage registers RV, or volatile registers RV, and non-volatile storage registers RNV, or non-volatile registers RNV.

Slave device S2 further comprises state variables 454 (STATE) used during the implementation of an I2C bus communication. More particularly, slave device S2 comprises:
a state variable PERSO indicating whether the configuration of slave device S2 has occurred or not;
a state variable FSAI indicating whether slave device S2 stores a temporary address; and
a state variable FSAD indicating whether the slave device is in an attribution mode or not.

According to an embodiment, when the configuration has not occurred yet, state variable PERSO represents a "0" (zero). When slave device S2 stores no address, state variable FSAI represents a "0" (zero). The value of state variable FSAD depends on the values of state variables PERSO and FSAI. When state variables PERSO and FSAI both represent a "0" (zero), state variable FSAD represents a "1" (one) indicating that the attribution mode is activated. As soon as one of the two variables PERSO or FSAI represents a "1" (one), the attribution mode is deactivated and state variable FSAD represents a "0" (zero). In other words, state variable FSAD corresponds to the inverse of the result of the application of a logic OR function to variables PERSO and FSAI.

FIG. 7 illustrates a practical example of a set of steps implemented by slave device S2 during the implementation of a method of attribution of an address AddT by master device M2. As previously mentioned, the set of steps described hereafter is a practical example of steps, but other sets of steps implemented by slave device S2 are to be provided. Slave device S2 and master device M2 are described in relation with FIG. 6.

Address AddT is of the type of the addresses AddP and AddS of slave device S2, that is, of the type of the address Add described in relation with FIG. 2. Thus, address AddT breaks down into a device type identifier DTIT and a device number CIT. According to an example, address AddT is a seven-bit binary word, identifier DTIT is a four-bit binary word, and number CIT is a 3-bit binary word.

More particularly, address AddT is of the type of the secondary address AddS of slave device S2, and has the same identifier as secondary address AddS. Thus, according to an embodiment, the identifier DTIT of address AddT is identical to the identifier DTIS of secondary address AddS, and is different from the identifier DTIP of main address AddP.

At a step 501 (START), slave device S2 is informed of the beginning of the communication by the reception of a start condition which has been executed by master device M2 over the data line SDA2 of bus I2C. Slave device S2 is thus arranged to receive and to read the data sent over data line SDA2.

At a step 502 (VERIF), consecutive to step 501, slave device S2 verifies its state. More particularly, slave device S2 verifies its state variable PERSO indicating whether its configuration has been performed or not, and its state variable FSAI indicating whether slave device S2 stores a temporary address.

Further, at step 502, consecutive to step 501, slave device S2 may read the default value of its secondary address AddS stored in a non-volatile register. According to a variant, the value of its secondary address may correspond to a value which has just been configured.

At a step 503 (ADDT), master device M2 sends a control signal comprising address AddT over data line SDA2. Slave device S2 reads address AddT and breaks its down into its identifier DTIT and its number CIT.

At a step 505 (DTIT=DTIP), consecutive to step 503, slave device S2 verifies the value of identifier DTIT. More particularly, the slave device compares identifier DTIT with the identifier DTIP of its main address AddP. If identifiers DTIT and DTIP are equal (output Yes), the next step is a step 506 (STANDARD CMD). Otherwise (output No), the next step is a step 507 (OTHER CMD).

At step 506, slave device S2 expects to receive conventional control signals, since the received identifier DTIT is the same as the identifier DTIP of its main address AddP.

At a step 508 (REF=CIS=CIP), consecutive to step 506, slave device S2 defines the number CIP of its main address AddP as a reference number REF.

At a step 509 (CIT=REF), consecutive to step 508, slave device S2 verifies whether the number CIT of the received address AddT is equal to reference number REF. If they are equal (output Yes), the next step is a step 510 (RECEIVE CMD). Otherwise (output No), the next step is a step 511 (QUIT).

At step 510, consecutive to address 509, slave device S2 has determined that the received address AddT is the same as its main address AddP, since identifier DTIT and number CIT are equal to the identifier DTIP and to the number CIP of main address AddP. Accordingly, slave device S2 reads the last bit of the control signal sent by master device M2, this bit indicates whether the slave device is transmitting or receiving in the rest of the communication.

At a step 512 (ACK CMD), consecutive to step 510, slave device S2 sends acknowledgement data over data line SDA2, and executes the order received from master device M2. The communication between devices M2 and S2 may continue like a conventional I2C bus communication, that is, for example, like the communication described in relation with FIG. 4. Step 512 further comprises the reception and the implementation of an order by slave device S2.

At step 511, consecutive to step 509, the slave device has determined that the received address AddT was different from its main address AddP. The I2C bus communication started by master device M2 does not concern slave device S2. Accordingly, slave device S2 sends no acknowledgement data, and stops monitoring data line SDA2.

At step 507, consecutive to step 505, the slave device has determined that identifier DTIT is different from the identifier DTIP of its main address AddP. The slave device thus expects to, perhaps, receive specific control signals.

At a step 513 (DTIT=DTIS), consecutive to step 507, slave device S2 verifies whether the identifier DTIT of the received address AddT is identical or not to the identifier DTIS of its secondary address AddS. If identifiers DTIT and DTIS are different (output No), the next step is a step 514 (QUIT). Otherwise (output Yes), the next step is a step 515 (FSAD).

At step 514, consecutive to step 513, slave device S2 has determined that the identifier DTIT of the received address AddT is different from the identifier DTIS of its secondary address AddS. Step 514 is identical to step 511. In other words, slave device S2 sends no acknowledgement data, and stops monitoring data line SDA2.

At step 515, consecutive to step 513, slave device S2 consults its state variable FSAD to know in which mode it is. If state variable FSAD indicates that slave device S2 is not in an attribution mode, for example, by representing a "0" (zero), (output 0), the next step is a step 516 (PERSO). If state variable FSAD indicates that slave device S2 is in an attribution mode, for example, by representing a "1" (one), (output 1), the next step is a step 517 (RECEIVE CMD).

At step 516, consecutive to step 515, slave device S2 consults its state variable PERSO to know whether a configuration has already occurred or not. If state variable PERSO indicates that a configuration has already occurred, for example by representing a "1" (one), (output 1), the next step is step 508 (REF=CIS=CIP). If state variable PERSO indicates that a configuration has not occurred yet, for example by representing a "0" (zero), (output 0), the next step is step 519 (REF=CIV).

At step 519, consecutive to step 516, slave device S2 defines a number CIV stored in the volatile register RV of slave device S2 like reference number REF. The next step is step 509. Number CIV is described in further detail hereafter.

At step 517, consecutive to step 515, slave device S2 has determined that it was in an attribution mode. Slave device S2 receives the control signal following address AddT in the control signal sent by master device M2.

At a step 520 (NO ACK), consecutive to step 517, slave device S2 sends no acknowledgement data to master device M2. Indeed, address AddT is not assigned thereto, it thus does not have to send acknowledgement data.

At a step 521 (BUS ACK), consecutive to step 520, slave device S2 remains attentive to the occurrence or not of acknowledgement data over data line SDA2 following the control signal comprising address AddT. If acknowledgment data are received (output Yes), the next step is a step 522 (ADDT NOT FREE). If no acknowledgment data are received (output No), the next step is a step 523 (ADDT FREE FSAI=1).

At step 522, consecutive to step 521, a slave device has responded to address AddT, this address AddT is thus not free.

At a step 525 (QUIT), consecutive to step 522, slave device S2 has determined that the received address AddT is the address of another slave device with which master device M2 can communicate. Step 525 is identical to steps 511 and 514. In other words, slave device S2 sends no acknowledgement data, and stops monitoring data line SDA2.

At step 523, consecutive to step 521, no slave device has responded to address AddT, slave device S2 can thus store address AddT into a volatile register RV and, for example, use address AddT as a temporary address. More particularly, slave device S2 stores number CIT in its volatile register RV. Number CIV is here then equal to number CIT. More generally, volatile register RV enables to store the number CIV of a free temporary address. Thus, if at the step 509 following step 519, number CIT is equal to the reference, that is, equal to number CIV, the slave device responds to a free temporary address. The next step is step 524.

Further, at step 523, slave device S2 indicates that it has received the free address AddT by modifying its state variable FSAI. According to an example, the state variable then represents value "1" (one).

At a step 524 (STOP), consecutive to step 523, slave device S2 stops taking part in the communication, for example, by stopping responding and sending acknowledgement data.

An advantage of the implementation mode of the attribution method described herein is that it requires no hardware change in the master device. It is compatible with conventional I2C bus communication methods.

Further, another advantage of this implementation is that it enables to assign a free address to a slave device without being previously aware of the free addresses. More particularly, this implementation enables to assign a free address to a slave device having a secondary address that may be conflicting with an address of another slave device, and this, after the installation of the slave device in the system comprising the master device.

Another advantage of the implementation mode of the attribution method is that it enables to modify a secondary address of a slave device. This is advantageous since the secondary address of a slave device may be, for example, a slave device configuration address.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

What is claimed is:

1. A method of attribution, on a communication over an inter-integrated circuit (I2C) bus, of a first address to a first device by a second device, the method comprising:
   receiving, by the first device from the second device, the first address over the I2C bus;
   after receiving the first address, monitoring, by the first device, the I2C bus for acknowledgement data for the first address; and
   in response to the second device not receiving the acknowledgment data for the first address, recording, by the first device, the first address.

2. The method according to claim 1, further comprising:
   receiving, by the first device from the second device, a second address over the I2C bus; and
   in response to the second device receiving second acknowledgement data for the second address, not recording, by the first device, the second address.

3. The method according to claim 1, further comprising recording, by the first device, the first address into non-volatile registers.

4. The method according to claim 1, wherein the first address is assigned to no device with which the second device may be communicating.

5. The method according to claim 1, wherein the first device is in an attribution mode in which the first device expects to be assigned an address, and leaves the attribution mode in response to recording the first address.

6. The method according to claim 5, wherein the first device comprises a first state variable indicating whether the first device is in the attribution mode or not.

7. The method according to claim 1, wherein the first device comprises a second state variable indicating whether the first device has recorded or not any address.

8. The method according to claim 1, wherein the first address comprises a device type identifier and a device number.

9. The method according to claim 1, wherein the first device is a slave device of the I2C bus communication.

10. The method according to claim 1, wherein the first device is a memory.

11. The method according to claim 10, wherein the first device is a non-volatile electrically erasable programmable read only memory (EEPROM).

12. The method according to claim 1, wherein the second device is a master device of the I2C bus communication.

13. The method according to claim 1, wherein the second device is a processor.

14. The method according to claim 1, further comprising:
   receiving, by a third device from the second device, a second address over the I2C bus; and
   in response to the second device not receiving second acknowledgment data for the second address, recording, by the third device, the second address.

15. The method according to claim 1, further comprising using, by the first device, the first address as a main address for the first device.

16. The method according to claim 1, further comprising using, by the first device, the first address as a secondary address for the first device.

17. The method according to claim 16, further comprising:
   receiving, by the first device, read and write control signals using a main address for the first device; and
   receiving, by the first device, memory configuration control signals using the secondary address for the first device.

18. The method according to claim 1, further comprising:
   using, by the first device, the first address as a dynamic secondary address for the first device; and
   after using the dynamic secondary address for a limited number of I2C bus communications, modifying, by the first device, the dynamic secondary address into another address different from the first address.

19. A slave device comprising:
   a non-volatile memory; and
   an inter-integrated circuit (I2C) bus communication interface configured to:
      receive, from a master device, a first address over the I2C bus;
      after receiving the first address, monitor the I2C bus for acknowledgement data for the first address; and
      in response to the master device not receiving the acknowledgment data for the first address, record the first address.

20. The slave device according to claim 19, wherein the I2C bus communication interface is further configured to:
   receive, from the master device, a second address over the I2C bus; and
   in response to the master device receiving second acknowledgement data for the second address, not record the second address.

21. The slave device according to claim 19, wherein the I2C bus communication interface is further configured to record the first address into non-volatile registers.

22. The slave device according to claim 19, wherein the first address is assigned to no device with which the master device may be communicating.

23. The slave device according to claim 19, wherein the slave device is configured to:
   be in an attribution mode in which the slave device expects to be assigned an address; and
   leave the attribution mode in response to recording the first address.

24. The slave device according to claim 23, wherein the slave device comprises a first state variable indicating whether the slave device is in the attribution mode or not.

25. The slave device according to claim 24, wherein the slave device comprises a second state variable indicating whether the slave device has recorded or not any address.

26. The slave device according to claim 19, wherein the first address comprises a device type identifier and a device number.

27. The slave device according to claim 19, wherein the non-volatile memory is of an electrically erasable programmable read only memory (EEPROM)-type.

28. The slave device according to claim 19, wherein the I2C bus communication interface is further configured to use the first address as a main address for the slave device.

29. The slave device according to claim 19, wherein the I2C bus communication interface is further configured to use the first address as a secondary address for the slave device.

30. The slave device according to claim 29, wherein the I2C bus communication interface is further configured to:
   receive read and write control signals using a main address for the slave device; and
   receive memory configuration control signals using the secondary address for the slave device.

31. The slave device according to claim 19, wherein the I2C bus communication interface is further configured to:
   use the first address as a dynamic secondary address for the slave device; and
   after using the dynamic secondary address for a limited number of I2C bus communications, modify the dynamic secondary address into another address different from the first address.

* * * * *